United States Patent
Sjögren

(10) Patent No.: US 8,226,177 B2
(45) Date of Patent: Jul. 24, 2012

(54) ANTI SPINNING DEVICE, A VEHICLE COMPRISING THE DEVICE AND A METHOD FOR REDUCING SLIP DURING ADVANCING OF A VEHICLE

(75) Inventor: Joakim Sjögren, Köping (SE)

(73) Assignee: Volvo Construction Equipment AB, Eskilstuna (SE)

( * ) Notice: Subject to any disclaimer, the term of this patent is extended or adjusted under 35 U.S.C. 154(b) by 1044 days.

(21) Appl. No.: 12/089,565

(22) PCT Filed: Oct. 21, 2005

(86) PCT No.: PCT/SE2005/001587
§ 371 (c)(1),
(2), (4) Date: Apr. 8, 2008

(87) PCT Pub. No.: WO2007/046736
PCT Pub. Date: Apr. 26, 2007

(65) Prior Publication Data
US 2008/0245591 A1    Oct. 9, 2008

(51) Int. Cl.
*B60K 17/00* (2006.01)
(52) U.S. Cl. ............................ 303/155; 180/197; 701/70
(58) Field of Classification Search .................. 303/2, 3, 303/15, 20, 113.2–166; 180/197, 417, 424; 701/70, 82, 84
See application file for complete search history.

(56) References Cited

U.S. PATENT DOCUMENTS

| 4,981,190 A | 1/1991 | Nakayama et al. |
| 5,629,850 A | 5/1997 | Okawa |
| 5,636,121 A * | 6/1997 | Tsuyama et al. ................ 701/70 |
| 5,769,180 A * | 6/1998 | Momose et al. ............... 180/424 |
| RE36,152 E | 3/1999 | Hosseini et al. |
| 6,161,641 A * | 12/2000 | Fukumura et al. ............ 180/197 |
| 6,330,927 B1 * | 12/2001 | Tokuda ......................... 180/197 |
| 6,631,320 B1 * | 10/2003 | Holt et al. ....................... 701/83 |
| 6,882,917 B2 * | 4/2005 | Pillar et al. ..................... 701/48 |
| 2002/0180262 A1 * | 12/2002 | Hara et al. .................. 303/119.1 |

FOREIGN PATENT DOCUMENTS

| EP | 0321893 A2 | 6/1989 |
| JP | 4002560 A | 1/1991 |
| WO | 2005012025 A1 | 2/2005 |

OTHER PUBLICATIONS

Supplementary European Search Report for corresponding European App. EP 05 79 6411, Mar. 2011.
International Search Report from corresponding International Application PCT/SE2005/001587, May 2006.
International Preliminary Report on Patentability from corresponding International Application PCT/SE2005/001587, Nov. 2007.

* cited by examiner

*Primary Examiner* — Christopher Schwartz
(74) *Attorney, Agent, or Firm* — WRB-IP LLP

(57) ABSTRACT

An anti spinning device for a powered vehicle is provided. The vehicle includes at least one driveline, the driveline including a power source and at least one rotatable element, which power source is connected to and arranged to transmit power to the at least one rotatable element. The anti spinning device includes an arrangement for detecting the fulfillment of a preset condition and an arrangement for interrupting the power transmission to the individual rotatable element when the preset condition is fulfilled. A method for controlling an anti spinning device, and a vehicle and a work vehicle such an anti spinning device, are also provided.

29 Claims, 3 Drawing Sheets

ANTI SPINNING DEVICE, A VEHICLE COMPRISING THE DEVICE AND A METHOD FOR REDUCING SLIP DURING ADVANCING OF A VEHICLE

BACKGROUND AND SUMMARY

The present invention relates generally to the field of anti spinning devices for vehicles, and more specifically to an anti spinning device for a work vehicle.

The invention also relates to a method for controlling such an anti spinning device.

The invention is applicable to all kind of vehicles equipped with ground engagement elements, e.g. wheels, that are sensitive to be damaged if they are allowed to spin on a rough surface. However, a preferred application is for work vehicles, e.g. wheel loaders, backhoe loaders, and the like, having rubber tires.

Work vehicles, e.g. a wheel loader, running slowly on a low gear during a working procedure, such as a loading procedure of the bucket, has a great torque transmitted to the ground engagement elements. If the propulsion of the work vehicle is obstructed by an external element and the wheels does not have sufficient grip to overcome the external force, the wheels run the risk of spinning due to the great torque transmitted to them. If one of the wheels spin, the great torque built up in the converter of the vehicle suddenly drops and the torque is lost for all wheels. At the same time the spinning wheel run the risk of being cut to pieces or punctured if the surface is rough and full of sharp or pointed stones. Since the wheels on work vehicles are quite large and expensive it is costly for the contractor each time a wheel is damaged, due to material costs as well as troublesome maintenance.

Today the contractor is totally dependent on the driving skills of the operators of the work vehicles. Even though the operators are well experienced, they may misjudge the nature of the ground and cause the tires severe damages by unintentional spinning. The operator is forced to know when to step off the accelerator, more precisely he/she has to step off the accelerator in the time span between the vehicle stops to move and the wheels starts to spin. Most times these two things appear at the same time, which makes it impossible to succeed.

One known way of trying to solve the problem of damaged tires due to unintentional spinning, is to brake the wheel that has started to spin, as soon as possible after detection of spinning taking place. But this method of trying to reduce the damages on the tires is too slow. The wheel has already rotated enough for the tyre to be cut into pieces or punctured. At the same time almost all of the torque that was built up in the converter is used up upon spinning, as mentioned above. One way of reducing the probability for unintentional spinning is to use a differential lock forcing each pair of wheels to rotate jointly, but this is not a preferred option on articulated vehicles since it may be quite large differences between the rotational speed of the inner wheel and that of the outer wheel upon turning. The use of a differential lock result in that both the differential lock itself and the tires are stressed. At the same time as the function of the differential lock as an anti spinning device is pore and random, since both wheels may spin together.

The present invention aims at obviating the aforementioned disadvantages of previously known anti spinning devices, and at providing an improved anti spinning device. It is desirable to provide an improved anti spinning device of the initially defined kind. It is also desirable to provide an anti spinning device, which ensure that the tires are spared by not being able to spin. It is also desirable to provide an anti spinning device, which ensures that the built up torque in the converter of the vehicle does not suddenly drop as a consequence of unintentional spinning. It is desirable to provide an anti spinning device, which is not dependent on the driving skills of the operator.

According to an aspect of the invention an anti spinning device comprises means for detecting the fulfillment of a preset condition and means for interrupting the power transmission to the individual rotatable element when the preset condition is fulfilled. Said condition is preferably related to the operation of the rotatable element.

According to an aspect of the present invention, there is provided an anti spinning device of the initially defined kind, in which the means for interrupting the power transmission comprises a braking system for braking a rotation of the rotatable element. Said braking system may comprise an individually controlled brake device for each rotating element.

According to another aspect of the invention, a method comprises the step of transmitting power to at least one rotating element in a vehicle driveline, and repeatedly interrupting the power transmission to the individual rotating element when a preset condition is fulfilled. Said condition is preferably related to the operation of the rotating element.

Thus, an aspect of the present invention is based on the insight of the importance of having an arrangement that may control each wheel independently regarding propulsion, braking and movement monitoring, and by means of this synchronize the rotation/position of the wheels. More precisely, each wheel is not allowed to rotate more than a predetermined angle before all wheels have rotated that predetermined angle, and then it recommence and each wheel is not allowed to rotate more than the predetermined angle before all the wheels have rotated the predetermined angle.

BRIEF DESCRIPTION OF THE DRAWINGS

A more complete understanding of the abovementioned and other features and advantages of the present invention will be apparent from the following detailed description of preferred embodiments in conjunction with the appended drawings, wherein.

DETAILED DESCRIPTION

It shall be pointed out that the invention is applicable on all kinds of powered vehicles, such as cars, buses, trucks, work vehicles, etc. Thereto the term work vehicle comprises different types of material handling vehicles like construction machines, such as wheel loaders, articulated haulers, backhoe loaders, motor graders and excavators. The invention will be described below arranged in a wheel loader. This is to be regarded only as an example of a preferred application, and not as a limitation.

Figure 1:
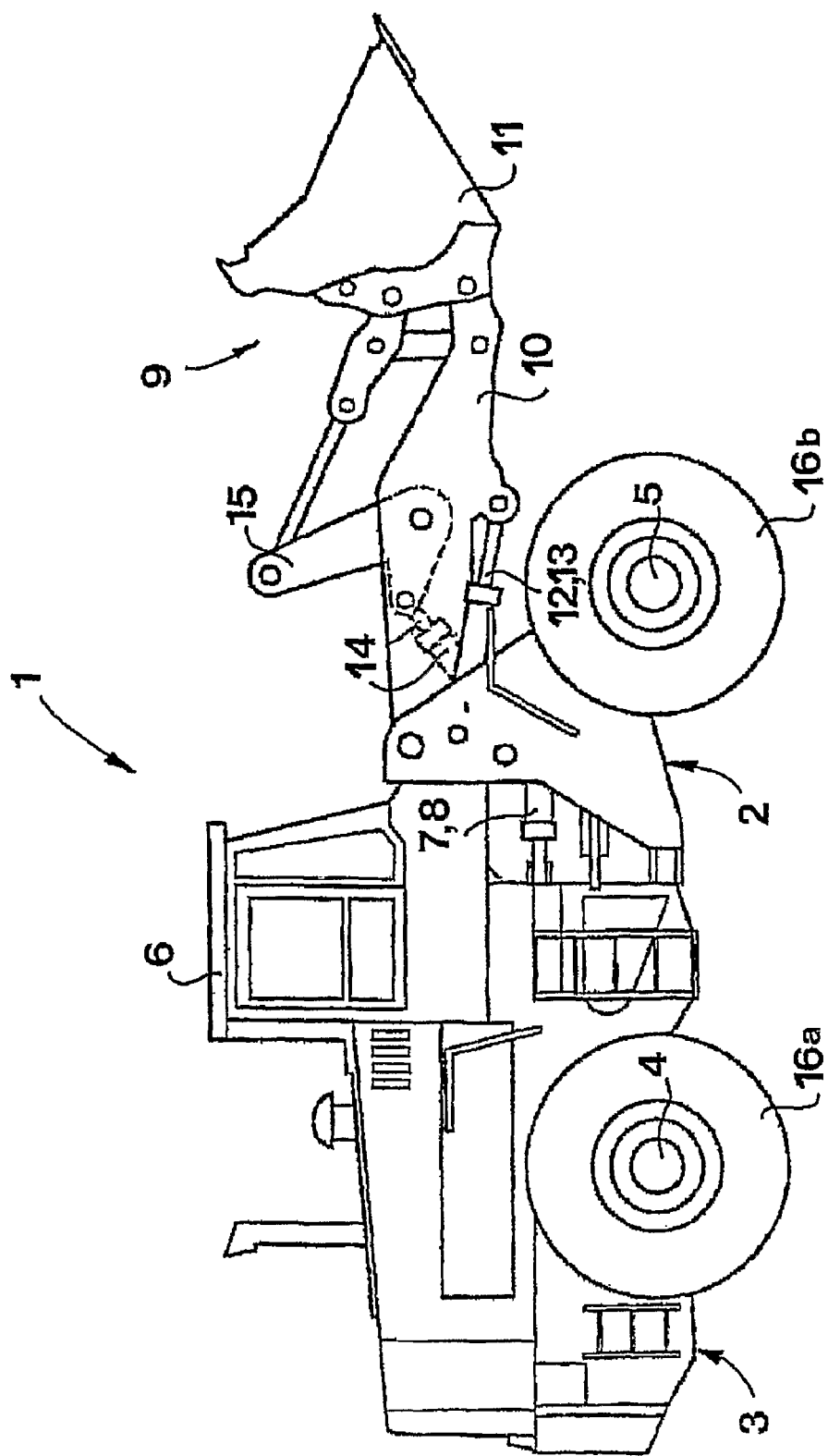
FIG. 1 is a side view of a wheel loader.

FIG. 1 shows a wheel loader 1. The body of the wheel loader 1 comprises a front body section 2 and a rear body section 3, which sections each has a pair of half shafts 4, 5. The rear body section 3 comprises a cab 6 for the operator who drives the vehicle. The body sections 2, 3 are connected to each other in such a way that they can pivot in relation to each other around a vertical axis by means of two first actuators, e.g. in the form of hydraulic cylinders 7, 8, arranged between the two body sections 2, 3. The hydraulic cylinders 7, 8 works as a pair, when one of them is extended the other one is contracted. The hydraulic cylinders 7, 8 are thus arranged one on each side of a horizontal centreline of the vehicle in the travelling direction of the vehicle in order to turn the wheel loader 1, in other words the wheel loader 1 is an articulated vehicle. It shall be pointed out that the vehicle not necessary has to be an articulated vehicle, many of the work vehicles or not articulated.

The wheel loader 1 comprises an equipment 9 for handling objects or material. The equipment 9 comprises a load arm unit 10 and an implement 11, e.g. in the form of a bucket, fitted on the load arm unit 10. A first end of the load arm unit 10 is pivotally connected to the front body section 2. The bucket 11 is pivotally connected to a second end of the load arm unit 10.

The load arm unit 10 can be raised and lowered relative to the front body section 2 of the vehicle by means of two second actuators, e.g. in the form of two hydraulic cylinders 12, 13, each of which is connected at one end to the front body section 2 and at the other end to the load arm unit 10. The bucket 11 can be tilted relative to the load arm unit 10 by means of a third actuator, e.g. in the form of a hydraulic cylinder 14, which can be connected at one end to the front body section 2 and at the other end to the bucket 11 via a link arm system 15.

Figure 2:
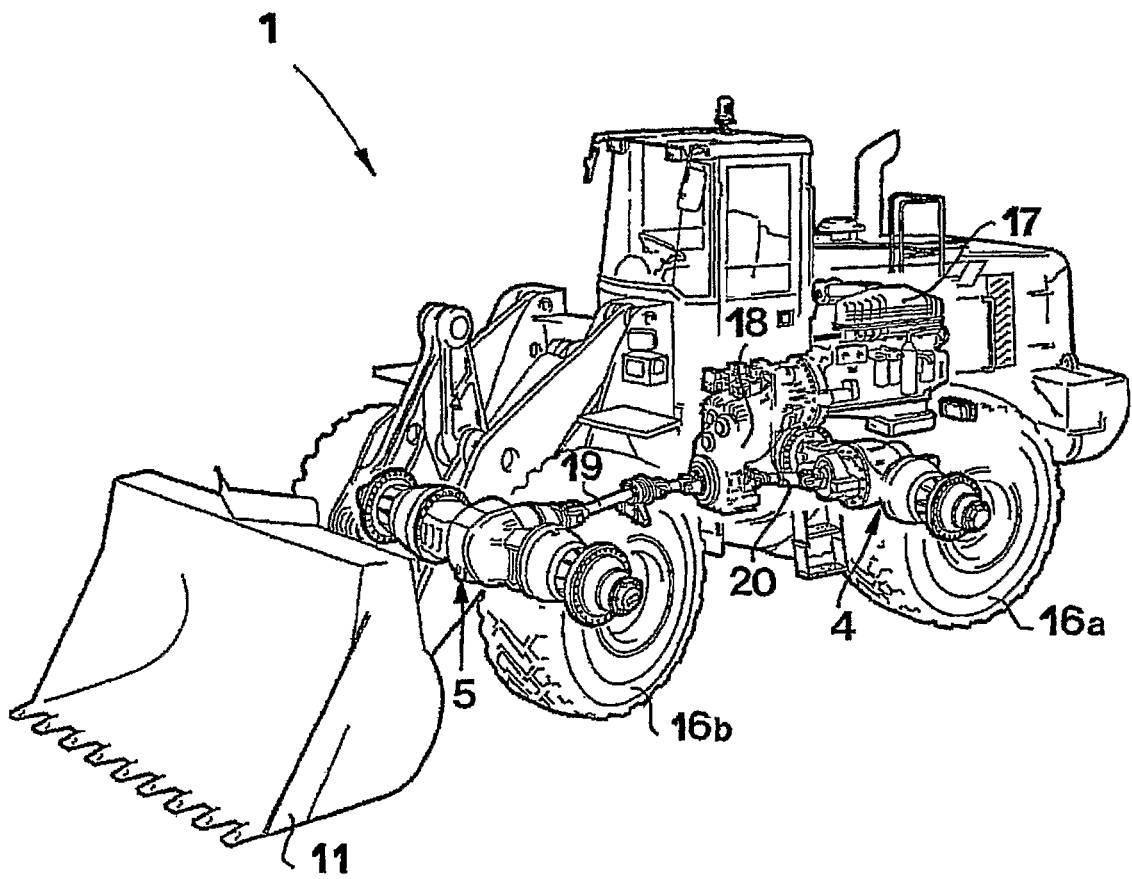
FIG. 2 is a perspective view of a partially cut away wheel loader showing the driveline of the wheel loader in detail, and FIG. 3 schematically shows an anti spinning device according to the invention.

Furthermore the wheel loader 1, shown in FIG. 1, comprises two pairs of ground engagement elements 16a, 16b, e.g. in the form of wheels, connected to the pairs of half shafts 4, 5. The wheels in each pair of wheels are arranged one on each side of the vehicle in the travelling direction of the vehicle. Said wheels 16a, 16b usually comprises rubber tires. At least one of the wheels 16a, 16b is a driven wheel and usually all wheels 16a, 16b are driven wheels on a wheel loader 1, or a work vehicle. The wheels 16a in the pair of wheels connected to the rear body section 3, are vertically movable in relation to the rear body section 3 independently of each other, in order to get a smoother and more controlled movement of the wheel loader 1. Reference is now also made to FIG. 2. In the shown embodiment the driveline of the wheel loader 1 comprises a power source in the shape of an internal combustion engine 17, preferably a diesel engine, connected to a conventional converter 18 via a gear box (not shown). The task of the converter 18 is to transmit the torque from the output shaft (not shown) of the power source 17 to the front 19 and rear drive shafts 20. The front 19 and rear drive shafts 20 are connected to the abovementioned pairs of half shafts 4, 5. It shall be pointed out that each pair of half shafts 4, 5 comprises a differential gear (not shown) connecting them to the corresponding drive shaft 19, 20, since the wheels in each pair of wheels 16a, 16b has a great difference in speed during turning of the wheel loader 1. Some vehicles may be equipped with engageable/disengageable differential locks.

It shall be pointed out that the term driveline, as used herein, stands for all the components transmitting power/torque from, and including, the power source to, and including, the ground engagement elements. The vehicle may comprise several drivelines, e.g. one driveline for each ground engagement element, such as a separate electric motor, or another appropriate power source, directly or indirectly connected to each ground engagement element. In the shown embodiment the driveline is mechanical, but it shall be realized that the transmission of power/torque in the driveline may be hydraulic (hydrostatic, hydrodynamic), electric, pneumatic, etc. Further, the power source may be an internal combustion engine, a fuel cell, an electric motor, etc. Furthermore, it shall be realized that the term rotatable/rotating element, as used herein, comprises any appropriate part of the driveline, such as a drive shaft, another power transmitting element in the driveline, a ground engagement element, or the like, rotating in order to advance the vehicle in a forward or backward direction. The driveline allows the ground engagement elements to rotate at different speed and the power transmitted to the ground engagement elements may be independently altered and controlled for each ground engagement element.

A control unit (not shown) e.g. a central processing unit (CPU), or the like, synchronizes the speed of rotation of the wheels 16a, 16b depending on how much the wheel loader 1 is turning, i.e. the steering angle, e.g. depending on the mutual extended/contracted position of the hydraulic cylinders 7, 8 or the angular displacement between the front body section 2 and the rear body section 3. Furthermore, said control unit takes into consideration if one of the rear wheels 16a travels over a big stone or down a hole, e.g. if one of the rear wheels 16 moves vertically in relation to the rear body section 3 during the advancing of the vehicle, i.e. if the inclination of one wheel axle differs from the other ones. In such a case, the wheel 16a in question has to travel a longer distance than the other wheels 16a, 16b, in order to move the vehicle a certain distance without unintentional turning of the wheel loader 1. More precisely, the control unit receives signals regarding the position of the wheels in relation to each other and in relation to the body of the vehicle, and determines how much power that shall be transmitted to each wheel. In other words a movement compensation has to be performed in order to get the individual wheel to rotate at an rotational speed adapted for the present steering angle or wheel axle inclination.

Figure 3:
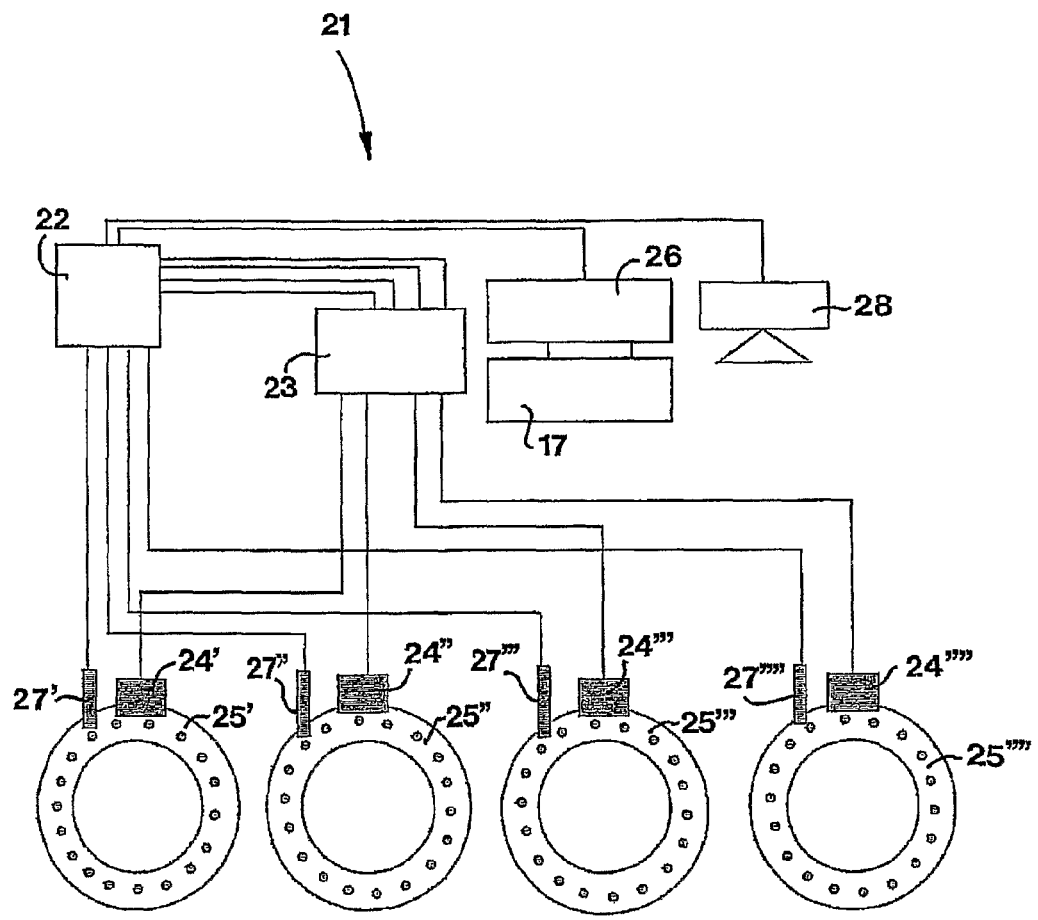

Reference is now also made to FIG. 3. The wheel loader 1 comprises an anti spinning device 21 according to the invention, schematically shown in FIG. 3. The anti spinning device 21 comprises a control means 22, e.g. a CPU, operatively connected to a braking system 23. The CPU 22 may be a separate one intended solely for the anti spinning device 21 or may be one already comprised in the vehicle.

However, the CPU 22 may be operatively connected to or be comprised of the control unit mentioned above, in order to determine movement compensations upon turning or movement over uneven ground. The braking system 23 controls at lest one brake device for at least one rotating element, in the shown embodiment the braking system 23 controls at least one brake device for each driven wheel 16a, 16b. The brake devices are represented by brake callipers 24', 24", 24'", 24"" and brake discs 25', 25", 25'", 25"" in FIG. 3, one pair of brake calliper and brake disc for each wheel. It shall be realized that other kinds of brake devices are included, such as drum brakes, shaft brakes, etc. The brake device may for example be a hydraulically activated friction brake comprising two sets of brake discs, the discs of a first set of discs located between the discs of a second set of discs. Furthermore, the braking system 23 controls each brake device independently, i.e. each existing brake device may be braked at different degree, e.g. depending on how much the wheel loader 1 is turning, and/or at different times and/or at different preset conditions or operating states. One or more of the power source 17, the converter 18, a transmission 26, or another appropriate part of the driveline, is operatively connected to the CPU 22, in order to be able to control the power transmission independently to each wheel.

Furthermore, the anti spinning device 21 may comprise one or more sensors transmitting signals to the CPU 22 comprising momentary positions of one or more of the rotating elements. In the shown embodiment the anti spinning device 21 comprises a sensor 27', 27'', 27''', 27'''' for each wheel 16a, 16b. Said sensors 27'-27'''' transmits signals comprising the momentary angular position of the brake discs 25'-25'''', or of the half shaft 4, 5, connected to the wheels 16a, 16b. Each sensor 21'-21'''' is operatively connected to the CPU. Based on at least two transmitted signals for each rotating element, the CPU 22 may detect, or analyse/determine, the angular movement of that rotating element, or the corresponding wheel, and the CPU 22 may thereafter translate this into how long distance that wheel, and thereby the wheel loader 1, has traveled during good/undisturbed circumstances, i.e. when the wheels does not spin. The movement of the wheel loader 1 in relation to the ground may also be detected. By means of a sensor 28, e.g. an optical sensor transmitting signals comprising the momentary position of the vehicle in relation to the ground to a control unit, which may detect the actual movement of the wheel loader 1 in relation to the ground.

When the operator of the wheel loader 1 is about to drive into a heap of sand or stone chippings in order to fill the bucket he/she usually slows the wheel loader 1 down and lowers the bucket 11. The anti spinning device 21 may be automatically activated or the operator manually activates the anti spinning device 21, by using an operator control means such as a button or the like. The initiation of the control of the operation of the anti spinning device may be automatically activated when a preset operating state is fulfilled, e.g. when the wheel loader 1 is driven on a certain gear, and/or within a certain range of speed, e.g. below a preset speed, and/or the equipment 11 is within a certain space/height, e.g. below a preset level in relation to the rest of the vehicle, and/or the built up torque in the converter is above a preset level. The termination of the control of the operation of the anti spinning device may be based on the fulfillment of a preset operating state, e.g. when the equipment 11 is beyond a preset levels, e.g. lifted above a preset level, and/or the direction of movement of the vehicle is altered, or another gear is put in. Said certain gear is preferably the lowest forward gear and/or the lowest reverse gear.

Upon activation of the anti spinning device 21 according to the invention, a synchronized pulse train of power is transmitted to at least one rotating element in the driveline of the vehicle. The pulse train is defined as a series of successive pulses. During the pulse train the transmitted power to the individual rotating element is repeatedly interrupted when a preset condition is fulfilled. The anti spinning device comprises means for detecting the fulfillment of the preset condition, e.g. said control unit 22. The interruption of the power transmission may be executed by individual braking of the rotation of the rotating element to a stop. Said preset condition may be a detection of when a preset angular movement/displacement of a rotating element has occurred, or when a predetermined time has lapsed, or the like. If lapsed time is used as a condition for detection, the motor speed, or the like, should preferably be used in order to be able to make appropriate compensations. More precisely, if the vehicle has a high momentary rotational speed on the wheels the preset time should be shortened. In a preferred embodiment all driven ground engagement elements 16a, 16b of the vehicle are individually braked to be totally stopped when the preset condition for each ground engagement element is fulfilled, and their mutual position is thereby confirmed/synchronized. When a preset condition is fulfilled for all controlled rotatable/rotating elements, the power transmission to the individual rotating element is restarted. At this point a new time measurement is started or a new angular movement is allowed.

In the shown embodiment, when the preset condition is fulfilled for all controlled rotatable elements, the braking system 23 releases the brake devices 24'-24'''', 25'-25'''' and the power from the power source 17, is once again allowed to be transmitted to the wheels 16a, 16b via the driveline. The individual sensor 27'-27'''' for each wheel 16a, 16b detects the momentary position of that specific wheel 16a, 16b, and a continuous signal, or discrete signals, is transmitted to the CPU 22, which detects/determines the angular movement of each wheel 16a, 16b. All signals are processed in the CPU 22 and when a predetermined angular displacement has been executed, the wheel 16a, 16b in question is braked to a stop, or the transmission of the power is interrupted. The power/torque from the power source 17 is transmitted to the remaining wheels 16a, 16b until all of them have rotated the predetermined angle. When none of the wheels 16a, 16b are spinning, they will theoretically reach the predetermined angular displacement at the same time. Further, when all wheels 16a, 16b have moved the predetermined angle, the CPU 22 gives a command to the brake system 23 to release the brake callipers 24'-24'''' and the power source 17 is once again allowed to transmit power to the wheels 16a, 16b, and so on. During operation the determined preset condition may be changed based on a detected operating state, which may be a operating state that differs from a movement of the vehicle straight ahead on an even surface. If the wheel loader 1 is turning or if one of the wheels 16a, 16b moves in a vertical direction in relation to the vehicle body, the CPU 22 preferably makes a movement compensation due to the fact that the wheels in such a case travels different long distances, and the CPU 22 changes/adapts the predetermined angular displacements for the wheels accordingly. For example, the predetermined angular displacement for the outer wheels in a turn is bigger than for the inner wheels.

If a wheel of a vehicle not equipped with the anti spinning device according to the invention does not have enough grip it will spin. If one of the wheels 16a, 16b of a vehicle comprising the anti spinning device 21 according to the invention, looses it grip it will only rotate the predetermined angle and then be braked to a stop until all wheels 16a, 16b have rotated the predetermined angle. In other words, the wheel 16a, 16b without a grip will not spin uncontrolled, but will only slip a small angle, i.e. the predetermined angle. Preferably the predetermined angle corresponds to a motion of the wheel in a forward or backward direction less than 3 cm and most preferably less than 1.5 cm, at the same time it should be more than 0.5 cm and preferably more than 1 cm. Depending on the radius of the wheels 16a, 16b the motion of the wheel in a forward or backward direction corresponds to different angular displacements of the wheels. It shall be pointed out that depending on the quality, or the grade, of the tyre motion of the wheel in a forward or backward direction can be longer as well as shorter than mentioned above, i.e. the motion of the wheel in a forward or backward direction can theoretically range from 0 cm and up.

When the counter force from the heap of stone chippings is greater than the propulsion force of the power source 17 the wheel loader 1 will not move, although the operator continuous to push down the accelerator pedal. The wheels 16a, 16b that may have slipped are not allowed to rotate any further and the wheels 16a, 16b having a good grip are not able to propel the vehicle. In the converter 18, the output shaft from the power source 17 is on high rotational speed but the front 19 and rear drive shafts 20 stands still. The converter 18 will become warm, but it is known how to cool down the converter 18 in an efficient way, by use of a cooler (not shown). If one or a couple of the wheels 16a, 16b slip it is not a great problem due to the fact that the built up torque in the converter 18 is still on a high level since the wheels 16a, 16b are not allowed to slip more than the predetermined angle. In other words, the built up torque in the converter 18 does not have the time to drop during a slippage. If a wheel is allowed to spin uncontrollably the torque in the converter will drop drastically and the wheels having a good grip does not get enough torque to propel the vehicle, even if they could. Due to the anti spinning device according to the invention, when one of the wheels 16a, 16b slip, the torque is still on a high level and transmitted to the wheels 16a, 16b having a good grip. If one or more of the driven wheels 16a, 16b does not reach the position corresponding to the predetermined angular displacement, the wheel loader 1 stands still no matter how much the operator pushes down the accelerator. This happens when at least one driven wheel 16a, 16b has a grip sufficient not to slip but not enough torque to overcome the external force from the heap of stone chippings, or the braking force on the wheels 16a, 16b that have slipped and are braked according to a preferred embodiment of the present invention.

In order to prevent that all driven ground engagement elements 16a, 16b spin at the same time, the predetermined angular displacement is compared with a continuous signal or several discrete output signals of the sensor 28. If the distance detected based on the output signals of said sensor 28 is shorter than the distance corresponding to the predetermined angular displacement, the CPU 22 sends a command to the brake system 23 not to release the braking of the braked wheels 16a, 16b.

When the vehicle does not move no matter how much the operator pushes down the accelerator, the bucket 11 cannot be filled further and it is time to put the wheel loader 1 in reverse and drive away with the filled bucket 11.

Another function of the inventive anti spinning device is as a backward application. More precisely, if a vehicle is driven on sand or another soft ground material and gets stuck, the inventive method and anti spinning device may be used in order to reverse the vehicle back to solid ground without spinning the wheels. A vehicle without the inventive device runs the risk of sinking further down into the sand if the wheels are spinning.

The invention is not limited only to the embodiments described above and shown in the drawings.

It shall be pointed out that in an alternative embodiment of the present invention the ground engagement element that has reached the predetermined angle before the other ground engagement elements is first braked and then released at the same time as the power transmitted to the ground engagement in question from the power source is interrupted. In other words, the ground engagement element is allowed to rotate but no torque is transmitted from the power source, i.e. the ground engagement element that has slipped does not obstruct the utilization of the torque transmitted to the ground engagement elements having a good grip and is not dragged/pushed over the rough surface by the other ground engagement elements having a good grip.

It shall be pointed out that the vehicle may have a different number of ground engagement elements/wheels than four as in the preferred embodiment. Preferably, the number of wheels shall be at least two. If three wheels are used, the single wheel is preferably connected to the rear body section of the vehicle in order to get a smaller turning radius of the vehicle.

It shall also be pointed out that the ground engagement elements not necessarily have to be a wheel having a rubber tyre. Other suitable ground engagement elements are included.

The invention claimed is:

1. A method for reducing slip during advancing of a vehicle in a forward or backward direction, comprising
   transmitting power to at least one rotating element in a vehicle driveline,
   repeatedly interrupting power transmission to the rotating element when a preset condition is fulfilled,
   detecting an angular movement of the rotating element about a rotational axis of the rotating element,
   interrupting the power transmission to the individual rotating element when the rotating element has moved a predetermined angular distance, and
   synchronizing a mutual position between a plurality of rotating elements.

2. A method according to claim 1, comprising
   detecting at least one operating state, and
   automatically repeatedly interrupting the power transmission to, the individual rotating element when a preset operating state is fulfilled.

3. A method according to claim 2, comprising
   the operating state comprising a gear position in a vehicle gear box, and
   that the preset operating state is only satisfied for a detected low gear.

4. A method according to claim 2, wherein
   the operating state comprises vehicle speed, and
   the preset operating state is only satisfied for a speed below a set limit.

5. A method according to claim 2, wherein
   the vehicle comprises an equipment with an implement for handling objects or material, and
   the operating state comprises a position of the equipment, and
   the preset operating state is only satisfied for an equipment position corresponding to when the implement is positioned below a preset limit.

6. A method according to claim 1, comprising
   detecting at least one operating state during operation, and
   determining the preset condition based on the detected operating state.

7. A method according to claim 6, comprising
   detecting a vehicle steering angle, and
   determining the preset condition based on the detected steering angle.

8. A method according to claim 6, comprising
   detecting an inclination of a wheel axle, and
   determining the preset condition based on the detected wheel axle inclination.

9. A method according to claim 1, comprising
   measuring a time, and
   interrupting the power transmission when a predetermined time has lapsed.

10. A method according to claim 9, wherein starting the time measurement when power is again transmitted to the rotating element after an interruption of power transmission.

11. A method according to claim 1, wherein interrupting the power transmission to the rotating element by individually braking the rotation of the rotating element to a stop.

12. A method according to claim 1, comprising
    restarting power transmission to the individual rotating element after the interruption when a preset condition is fulfilled for all controlled rotating elements.

13. A method according to claim 1, comprising
    transmitting power to at least two rotating elements, and
    restarting power transmission to the individual rotating element after the interruption when a chronologically last rotating element of the at least two rotating elements has fulfilled the preset condition.

14. A method according to claim 1, comprising
synchronizing the mutual position between the rotating elements by braking rotation of the rotating elements to a stop in order to synchronize their mutual position, and thereafter restarting the power transmission.

15. A method according to claim 1, comprising setting the condition individually for the rotating element during operation.

16. A method according to claim 1, comprising
sensing an activation of an operator control means, and
interrupting the power transmission to the individual rotating element when the operator control means is activated.

17. A method according to claim 1, wherein
the vehicle comprises an equipment with an implement for handling objects or material, and
comprising
detecting a position of the equipment, and
automatically ceasing interrupting the power transmission to the individual rotating element when the implement is positioned above a preset limit.

18. An anti spinning device for a powered vehicle, which vehicle comprises at least one driveline, the driveline comprising a power source and a plurality of wheels including at least one first wheel, which power source is connected to and arranged to transmit power to the at least one first wheel, the anti spinning device comprising
means for detecting fulfillment of a preset condition,
means for repeatedly interrupting power transmission to the at least one first wheel when the preset condition is fulfilled,
wherein the means for detecting a preset condition includes a sensor for each wheel of the plurality of wheels, each sensor being arranged to detect a momentary position of a respective wheel, and the means for detecting a preset condition further includes a central processing unit arranged to determine angular movement of each wheel of the plurality of wheels about a respective rotational axis of each wheel of the plurality of wheels, and
wherein the means for repeatedly interrupting the power transmission to the at least one first wheel is arranged to brake the at least one first wheel to a stop or arranged to interrupt transmission of the power to the at least one first wheel when the at least one first wheel has executed a predetermined angular displacement, and is arranged to transmit power from the power source to the remaining wheels of the plurality of wheels until each wheel of the at least one wheel has rotated through a predetermined angle.

19. An anti spinning device according to claim 18, wherein the anti spinning device comprises activation means.

20. An anti spinning device according to claim 19, wherein the activation means is arranged to automatically activate the anti spinning device when a preset operating state is fulfilled.

21. An anti spinning device according to claim 19, wherein the activation means comprises an operator control means.

22. An anti spinning device according to claim 18, wherein the means for interrupting the power transmission comprises a braking system for braking a rotation of the at least one first wheel.

23. An anti spinning device according to claim 22, the braking system comprising an individually controlled brake device for each wheel of the plurality of wheels.

24. An anti spinning device according to claim 18, wherein the anti spinning device comprises means for detecting at least one operating state.

25. An anti spinning device according to claim 24, wherein the anti spinning device comprises means for determining the preset condition based on the detected operating state.

26. An anti spinning device according to claim 18, wherein the means for detecting the fulfillment of the preset condition comprises a control unit.

27. An anti spinning device according to claim 18, wherein the anti spinning device comprises a sensor arranged to read a momentary position of the vehicle in relation to the ground.

28. A vehicle, wherein the vehicle comprises an anti spinning device according to claim 18.

29. A work vehicle comprising an equipment with an implement for handling objects or material, wherein the work vehicle comprises an anti spinning device according to claim 18.

* * * * *